Patented Jan. 12, 1937

2,067,853

UNITED STATES PATENT OFFICE 2,067,853

METHOD FOR THE PREPARATION OF ARALKYL ETHERS OF CELLULOSE

Eugene J. Lorand, Wilmington, Del., assignor to Hercules Powder Company, Wilmington, Del., a corporation of Delaware No Drawing. Application November 1, 1934, Serial No. 751,087

12 Claims. (Cl. 260—152)

This invention relates to a method for the preparation of aralkyl ethers of cellulose, and more particularly to a method for the preparation of benzyl cellulose.

Aralkyl ethers of cellulose are produced by the reaction of an aralkyl halide upon an intimate mixture of cellulose and alkali, usually referred to as alkali cellulose. Many procedures for effecting this reaction between an aralkyl halide and alkali cellulose are known to the art, but substantially all of them involve the heating together of the several reactants, usually at a temperature of from about 60° C. to about 130° C. When relatively high temperatures are employed during the reaction, it is customary to permit distillation of water and aralkyl halide from the reaction mass, the aralkyl halide, which distills over, usually being returned to the reaction mass. The amount of alkali required in the reaction may be added at the start of the reaction, but ordinarily only a portion of the necessary alkali will be added at the start of the reaction and the remainder will be added periodically during the course of the reaction.

The alkali cellulose used in the reaction is ordinarily prepared by immersing a suitable cellulosic material, such as purified cotton linters, etc., in an aqueous alkali solution of the desired concentration, which, depending upon the particular reaction procedure to be followed, may vary from about 18% to about 50%. The cellulose is permitted to absorb a maximum quantity of the aqueous alkali solution and is then pressed in order to expel a considerable quantity of alkali solution. The amount of alkali solution which is permitted to remain absorbed in the cellulose amounts to about 200-400%, by weight, of the amount of cellulose, and accordingly by far the larger part of the alkali solution initially absorbed is expelled.

Because of the preferential adsorption of alkali by the cellulose fibers, the aqueous solution expelled by pressing is of a lower alkali concentration than that originally used. The alkali solution expelled from the fibers by the pressing procedure may be fortified by the addition of fresh alkali and used again for the preparation of more alkali cellulose. There is, however, a limit to the reuse of such alkali solutions, since, especially when only partially purified cellulosic material is used in the preparation of alkali cellulose, various impurities are dissolved which are continuously built up by the reuse of the same solution until they reach a limit which renders further use of such solutions impossible.

It is apparent that it would be advantageous to use, in the preparation of alkali cellulose, only that quantity of aqueous alkali solution which is retained by the cellulose after the pressing operation. However, if such a small volume of solution were used for the impregnation of the cellulosic material, it would be absorbed completely by those fibers with which it first came in contact, and a substantial portion of the cellulose would remain entirely free from alkali. The requisite amount of alkali cannot be introduced in a large volume of water sufficient to wet all of the cellulose, because the concentration of alkali in such a solution would be far too low, and the large amount of water would have a harmful effect on the reaction and on the quality of the product.

In my copending application Serial No. 740,651, filed August 20, 1934, I have disclosed and claimed an improved method for the production of aralkyl ethers of cellulose in which only that amount of aqueous alkali solution which is to be retained by the alkali cellulose is employed in its production. This procedure involves the treatment of cellulose with the desired quantity of aqueous alkali solution emulsified in the aralkyl halide employed in the reaction.

In accordance with the present invention the procedure above described is improved by first "conditioning" the cellulosic material used, before treating it with the emulsion described by incorporating therein a controlled amount of moisture. This pre-treatment has a marked effect upon the subsequent aralkylation reaction. Cellulose so treated is more readily and uniformly etherified than is cellulose which has not been subjected to such pre-treatment, and the reaction is complete in a shorter period with resultant lessened consumption of reactants.

The procedure in accordance with the present invention therefore involves first the incorporation of a controlled amount of water in the cellulosic material used, as, for example, purified cotton linters, wood pulp, etc. The amount of water incorporated may vary from about 10% to about 100% by weight of the cellulose, but preferably will be within the range of 15-50%. The incorporation may be effected in various ways. Thus, for example, the cellulose may be placed in a closed container which is kept saturated with water vapor until equilibrium conditions are obtained. The quantity of water absorbed depends largely upon the temperature maintained. For example, at room temperature the cellulose will absorb about 14-16% water, while at higher temperatures higher proportions will be absorbed.

Alternatively the cellulose fibres may be immersed in water, removed and pressed or centrifuged to a desired water content. The incorporation of water may be carried out at any time prior to the start of the aralkylation reaction, since the moist cellulose may be maintained almost indefinitely in that condition.

When the cellulosic material has obtained the desired moisture content, the aralkylation reaction is effected in the manner described in my copending application referred to above. Thus, an aqueous alkali solution, for example, of sodium hydroxide, potassium hydroxide, etc., desirably of a concentration within the range of about 18% to about 40%, depending upon the particular etherification procedure that is to be followed, is emulsified in a relatively large quantity of the aralkyl halide which is to be used in the etherification reaction. The aqueous alkali solution will be used in an amount equal to that normally remaining in alkali cellulose after its formation; that is to say, in amount from about 200 to about 400% of the weight of cellulose. The aralkyl halide will be used in the amounts normally used in the particular etherification reaction. If desired, the alkali solution may be emulsified in somewhat smaller amounts of aralkyl halide than are to be used in the reaction, and the additional aralkyl halide may be added at a later stage in the reaction.

As an emulsifying agent, there may be used the higher fatty acids, either saturated or unsaturated, such as oleic acid, the acids of coconut oil, etc., or their corresponding alkali soaps; abietic acid or its alkali soaps, etc., sulphonated oils or aromatic sulphonic acids, etc.

The emulsion may be prepared by dissolving the emulsifying agent in that phase in which it is soluble; thus, for example, the various fatty and rosin acids in the aralkyl halide, and the various soaps and alkali salts in the aqueous alkali solution, and adding the second phase slowly thereto while imparting vigorous agitation to the mixture. The emulsion obtained is not in all cases of great stability. However, since it is to be used almost immediately, lack of stability is no particular defect.

After the emulsion has been prepared, the moist cellulosic material, properly shredded or otherwise finely divided, is mixed into the emulsion. During this mixing procedure, the mass should be vigorously and thoroughly agitated in order to insure uniform distribution of the alkali throughout the cellulose. Alternatively, the cellulose may be soaked in a mixture of aralkyl halide and emulsifying agent and the aqueous alkali solution then added to the mass with thorough agitation. An emulsion of the alkali is thus formed on the surface of the cellulose fibers, insuring a satisfactory distribution.

When all the components of the etherification mixture have been brought together and thoroughly mixed by any of the procedures described above, heat is applied to the reaction mass in order to start the etherification reaction. It is preferable, but not necessary, to carry out the initial stages of the reaction at a relatively low temperature and with relatively slight agitation, for example, in the manner described in my copending application, Serial No. 725,078, filed May 11, 1934, and to continue the reaction in this manner until the reaction mass attains complete uniformity. The temperature may then be increased, if desired, to a temperature at which distillation will begin. Additional alkali and additional quantities of aralkyl halide may be added to the reaction mass from time to time in accordance with the particular etherification procedure being followed. When the reaction is complete, as indicated by complete dispersion of the cellulosic fibers, the aralkyl ether of cellulose formed may be separated from the reaction mass by any of the known methods.

The following examples are illustrative of the procedure in accordance with this invention.

*Example 1*—160 grams of purified cotton linters are spread out on a wire screen of non-corroding metal which is then placed in a vessel, the bottom of which is covered by water. Care should be taken to avoid any direct contact between the linters and water. After 3-4 days, the linters are immersed in 1700 grams benzyl chloride, and to this mixture, a solution or dispersion of 20 grams of sodium caprate in 500 grams of 33% sodium hydroxide solution are added with good agitation. The whole batch is then heated in a Werner & Pfleiderer mixer, run at a very low speed, to 90° C. for 20-24 hours. Then 110 grams solid caustic soda are added (preferably in several portions) and the temperature is raised to effect distillation (120-125° C.). The speed of agitation is also increased. When practically all the water has distilled over (in about 3 hours), the benzylation is usually finished. If undispersed fibers are observed on closer inspection, the distillation may be continued, after the addition of some 33% sodium hydroxide solution, until all the fibers are dispersed. The benzyl cellulose formed may be separated from the reaction mixture by any known process, such as, for example, precipitation with isopropyl ether.

*Example 2*—100 grams purified cotton linters are immersed in 1500 grams of water. After a few hours, the excess water is removed in a wringer, so that the weight of the moist linters is about 130-150 grams. After shredding in any suitable apparatus, such as a Werner & Pfleiderer shredder, the linters are brought into contact with a solution of 50 grams of pine oil in 1100 grams of benzyl chloride; then, with vigorous agitation, 3200 grams 40% sodium hydroxide solution are added and the whole mixture is placed in a suitable apparatus equipped for stirring and distillation. The temperature is raised to about 120-125° C., when a mixture of benzyl chloride and water distils over. After about 3 hours, the greater part of the water has thus been removed. At this point, 150 grams 33% sodium hydroxide solution are added and the distillation is continued until practically all the water is removed from the batch. The benzyl cellulose may then be separated from the reaction mixture in any suitable manner.

It will be understood that the method in accordance with this invention is applicable to any of the usual and well known procedures for the production of aralkyl ethers of cellulose and is not limited in any way by the details and examples set forth hereinabove as illustrative only.

What I claim and desire to protect by Letters Patent is:

1. The method for the preparation of aralkyl ethers of cellulose which includes incorporating a controlled quantity of water in cellulose and then treating the moist cellulose at reaction temperature with an aralkyl halide and an aqueous alkali solution emulsified together in the presence of an emulsifying agent.

2. The method for the preparation of aralkyl ethers of cellulose which includes incorporating 10-100% by weight of water in cellulose and then treating the moist cellulose at reaction temperature with an aralkyl halide and an aqueous alkali solution emulsified together in the presence of an emulsifying agent.

3. The method for the preparation of aralkyl ethers of cellulose which includes incorporating a controlled quantity of water in cellulose and then treating the moist cellulose at reaction temperature with benzyl chloride and an aqueous alkali solution emulsified together in the presence of an emulsifying agent.

4. The method for the preparation of aralkyl ethers of cellulose which includes incorporating 10-100% by weight of water in cellulose and then treating the moist cellulose at reaction temperature with benzyl chloride and an aqueous alkali solution emulsified together in the presence of an emulsifying agent.

5. The method for the preparation of aralkyl ethers of cellulose which includes incorporating a controlled quantity of water in cellulose, and then treating the moist cellulose at reaction temperature with an emulsion of an aqueous alkali solution and aralkyl halide containing an emulsifying agent.

6. The method for the preparation of aralkyl ethers of cellulose which includes incorporating a controlled quantity of water in cellulose, immersing the moist cellulose in an emulsion of an aqueous alkali solution and an aralkyl halide containing an emulsifying agent and bringing the mixture to reaction temperature.

7. The method for the preparation of aralkyl ethers of cellulose which includes incorporating a controlled quantity of water in cellulose, mixing the moist cellulose with an aralkyl halide solution of an emulsifying agent, admixing this mixture with an aqueous solution of an alkali and bringing the mixture to reaction temperature.

8. The method for the preparation of aralkyl ethers of cellulose which includes incorporating a controlled quantity of water in cellulose, mixing the moist cellulose with an aralkyl halide, admixing this mixture with an aqueous solution of an alkali containing an emulsifying agent, and bringing the mixture to reaction temperature.

9. The method for the preparation of benzyl cellulose which includes incorporating a controlled quantity of water in cellulose, and then treating the moist cellulose at reaction temperature with an emulsion of an aqueous alkali solution and an aralkyl halide containing an emulsifying agent.

10. The method for the preparation of benzyl cellulose which includes incorporating a controlled quantity of water in cellulose, immersing the moist cellulose in an emulsion of an aqueous alkali and benzyl chloride containing an emulsifying agent, and bringing the mixture to reaction temperature.

11. The method for the preparation of benzyl cellulose which includes incorporating a controlled quantity of water in cellulose, mixing the moist cellulose with a benzyl chloride solution of an emulsifying agent, admixing this mixture with an aqueous solution of an alkali and bringing the mixture to reaction temperature.

12. The method for the preparation of benzyl cellulose which includes incorporating a controlled quantity of water in cellulose, mixing the moist cellulose with benzyl chloride, admixing this mixture with an aqueous solution of alkali containing an emulsifying agent, and bringing the mixture to reaction temperature.

EUGENE J. LORAND.